United States Patent [19]

Martin

[11] 4,284,424
[45] Aug. 18, 1981

[54] NECK RING ASSEMBLY FOR AUTOMATIC BLOW MOLDING MACHINES

[75] Inventor: John K. Martin, Monterrey, Mexico

[73] Assignee: Investigacion Fic Fideicomiso, Monterrey, Mexico

[21] Appl. No.: 99,545

[22] Filed: Dec. 3, 1979

Related U.S. Application Data

[62] Division of Ser. No. 898,080, Apr. 20, 1978, Pat. No. 4,200,449.

[51] Int. Cl.³ ............................................. C03B 9/325
[52] U.S. Cl. ....................................... 65/241; 65/235; 65/264
[58] Field of Search ................. 65/229, 241, 264, 265, 65/266, 235, 236

[56] References Cited
U.S. PATENT DOCUMENTS 4,052,187 10/1977 Spaeth et al. ...................... 65/235 X Primary Examiner—Arthur D. Kellogg
Attorney, Agent, or Firm—Kemon & Estabrook

[57] ABSTRACT

A rotatable neck ring assembly for use primarily in an automatic blow molding machine includes an annular bushing and a concentrically arranged series of pivotally mounted foot members which in their closed position cooperate with the bushing to hold a parison during molding of the ware. The feet are spring-biased toward open position and cammed in to closed position when engaged by the upwardly moving parison mold. Cam surfaces on the outer surface of the feet cooperate with corresponding surfaces on a concentrically surrounding sleeve to hold the ring tightly closed on the rim of the parison even after lowering of the parison mold and throughout the blow molding portion of the cycle. The ring is opened following the molding and cooling portions of the cycle by hydraulic pressure acting on a piston which engages the upper surface of the bushing to force the feet to pivot outwardly.

2 Claims, 3 Drawing Figures

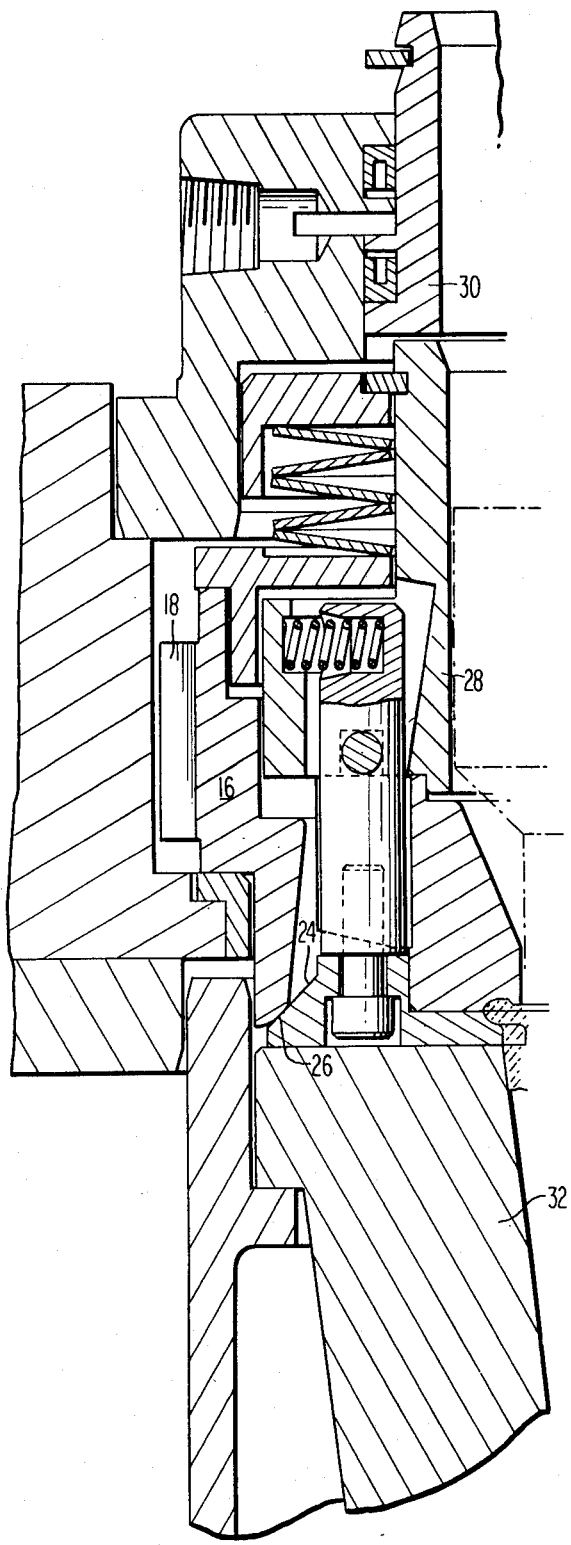
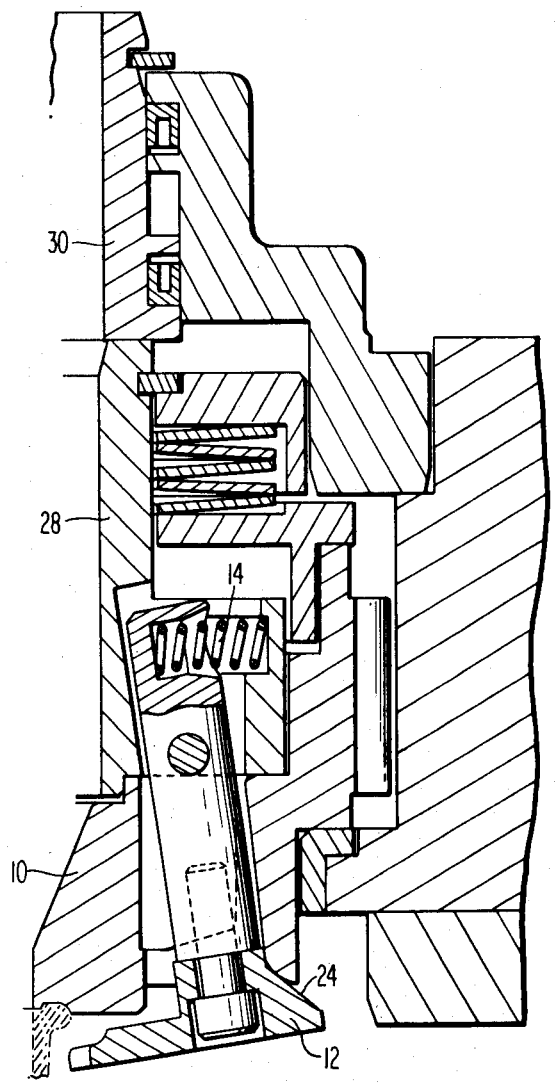
FIG. 2A
FIG. 2B

NECK RING ASSEMBLY FOR AUTOMATIC BLOW MOLDING MACHINES

This is a division of my co-pending application Ser. No. 898,080 filed Apr. 20, 1978 now U.S. Pat. No. 4,200,449.

BACKGROUND OF THE INVENTION

As is well known to those skilled in this art, neck rings are rotatable assemblies which cooperate with the parison mold to support the upper end of the parison as soon as it is formed and on through the remainder of the molding cycle. Neck rings of the prior art conventionally include a plurality of segments which are held in closed position by such means as a garter type spring which is the only means for holding the neck ring in its closed parison supporting position. Due to the limited holding force of such garter spring arrangements, every time that the parison is formed in the parison mold while in contact with the neck ring assembly, small amounts of molten glass are permitted to enter between the mating surfaces of the neck ring segments resulting in a high rate of wear on the movable and mating components of the neck ring assembly. This, in turn, necessitates frequent replacement of the neck ring assemblies which add substantially to the cost of the molding operation due not only to the cost of the assemblies themselves but to the time necessary for shut-down and replacement.

BRIEF SUMMARY OF THE INVENTION

In accordance with the present invention, the garter spring holding means of the prior art are eliminated completely and a neck ring assembly is provided with a camming arrangement which insures that once placed in the closed position by the force of the parison mold moving upwardly into engagement with the underside of the neck ring segments, the mating surfaces of the assembly are held in rigid contact with each other under a very substantial force which requires a hydraulic jack arrangement to effect reopening following the molding cycle and after withdraw of the parison mold from contact with the neck ring segments.

BRIEF DESCRIPTION OF THE DRAWINGS

FIGS. 2A and B are split sectional views of the closed and opened positions of the neck ring assembly respectively.

DETAILED DESCRIPTION OF THE DRAWINGS

Figure 1:
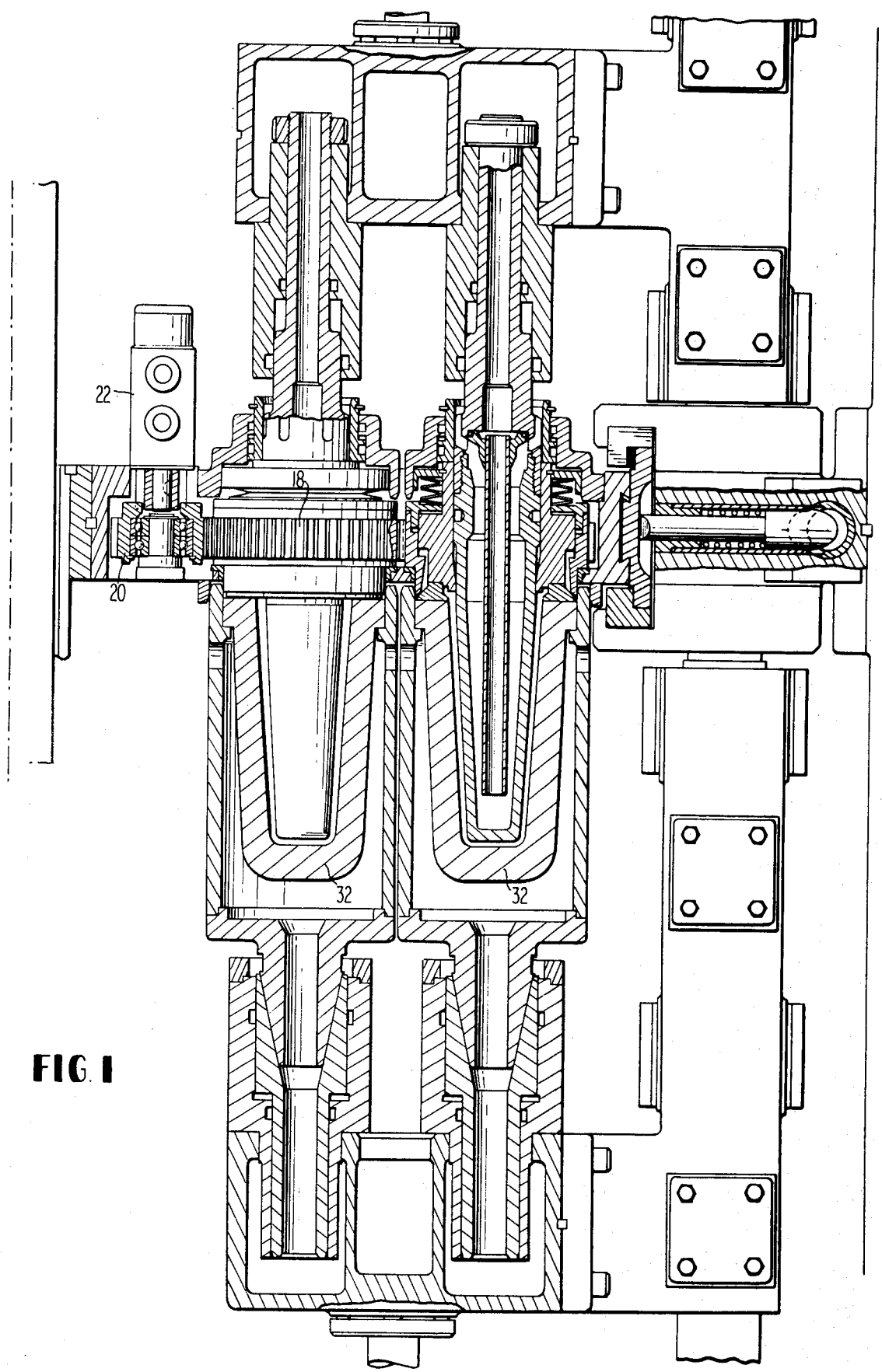
FIG. 1 is a side elevation partially in section of a pair of neck ring assemblies mounted in a neck ring supporting arm of an automatic blow molding maching.

Each neck ring is formed of a bushing 10 and a plurality of pivoted segmental foot members 12. In the embodiment of FIGS. 2A and B the foot members 12 are each biased toward open position by means of coil springs 14. Each neck ring assembly further includes an annular sleeve 16 having an external ring gear 18 formed in its periphery to provide a drive connection for rotating the ring during the molding operation. As shown in FIG. 1, the ring gears 18 of adjacent neck ring assemblies mate with each other and one of the ring gears mates also with a pinion 20 driven for example by a hydraulic motor 22. Each pivoted shoe member 12 includes a cam surface 24 lying at about a 45° angle with the longitudinal axis of the foot member itself. As shown clearly in FIGS. 2A and B, the cam surface 24 mates with a correspondingly tapered but slightly rounded surface 26 formed at the lower end of the sleeve 16. The foot members are carried in the counter bore of a cylindrical sleeve 28. A further cylindrical sleeve 30 forms the piston of a hydraulic motor which when activated is operative to force the neck ring to open and release the ware.

When the parison mold 32 is elevated into engagement with the underside of the neck ring, it forces the foot members to pivot to the position shown in FIG. 2A. There will be a substantial frictional force between the surfaces 24 and 26 which has to be overcome by the very large force applied to elevate the parison molds into operative position. The force is sufficient to overcome the frictional force between the surfaces 24 and 26 and introduce a substantial hoop stress in that portion of the neck ring sleeve surrounding the pivoted foot members. This, in turn, creates a substantial force tending to prevent opening of the neck ring after lowering of the parison molds out of contact with the foot members 12 and in fact, the force is so great, that it can only be overcome by the application of substantial hydraulic pressure through the fitting 32 which causes the sleeves 30 and 28 to move downwardly overcoming the frictional force between the surfaces 24 and 26 until the parts assume the position shown in FIG. 2B which then permits the pivoted foot members to pivot radially outwardly under the force of the biasing spring 14 and release the molded ware. A Belleville spring 34 biases the parts to the closed neck ring position illustrated in FIG. 2A and the force of this spring must also be overcome by the downward movement of the sleeve 30 in order to permit the neck ring to open. Because of the extremely high forces which hold the segment of the neck ring and the pivoted foot members in contact with each other, burning of the edges between ajacent segments which would otherwise be caused by the entry of molten glass therebetween is substantially overcome and the life of the neck ring is much greater than in the apparatus of the prior art.

I claim:
1. A rotatable ware supporting neck ring assembly for a blow molding machine comprising in combination:
   a horizontal support member;
   an annular bushing mounted for rotation on a vertical axis of said support member;
   a plurality of segments each having a foot portion which in the closed, ware supporting position of the assembly are in intimate contact with each other and with said bushing and substantially coextensive with the undersurface of said bushing, each of said segments being pivotally supported with respect to, and spring biased radially outwardly of, said bushing;
   means defining a radially inwardly opening annular groove in the adjoining inner surfaces of said bushing and said segments;
   means defining a first cam surface inclined to the vertical on the radial outer surface of each of said segments;
   means defining a second cam surface with is annular, rigidly carried by said support member and engaging the cam surfaces of each of said segments;
   means mounting said bushing and segments for sliding vertical movement on said support member between upper and lower positions with respect to said second cam surface so that in the upper of said positions, said segments are cammed radially inwardly into tight engagement with each other and with said bushing and in the lower position, said segments are biased out of engagement with said bushing;

further means biasing said bushing and segments toward the upper of said positions; and hydraulic means for moving said bushing and segments downwardly against the force of said further biasing means and against the frictional forces between said first and second cam surfaces.

2. An assembly as defined by claim 1 in which there are six of said segments.

* * * * *